US 9,416,825 B2

(12) United States Patent
Lee (10) Patent No.: US 9,416,825 B2
(45) Date of Patent: Aug. 16, 2016

(54) ALL-WHEEL DRIVE DISCONNECT CLUTCH

(71) Applicant: Schaeffler Technologies AG & Co. KG, Herzogenaurach (DE)

(72) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/620,876

(22) Filed: Feb. 12, 2015

(65) Prior Publication Data

US 2015/0152921 A1    Jun. 4, 2015

Related U.S. Application Data

(63) Continuation-in-part of application No. 13/849,142, filed on Mar. 22, 2013, now abandoned.

(60) Provisional application No. 61/615,655, filed on Mar. 26, 2012.

(51) Int. Cl.
| | |
|---|---|
| *F16D 13/14* | (2006.01) |
| *F16D 15/00* | (2006.01) |
| *F16D 23/06* | (2006.01) |
| *F16D 13/06* | (2006.01) |
| *F16D 13/52* | (2006.01) |
| *F16D 43/21* | (2006.01) |
| *B60K 17/02* | (2006.01) |

(Continued)

(52) U.S. Cl.
CPC ............... *F16D 13/06* (2013.01); *F16D 13/14* (2013.01); *F16D 13/52* (2013.01); *F16D 15/00* (2013.01); *F16D 23/0612* (2013.01); *F16D 43/211* (2013.01); *B60K 17/02* (2013.01); *F16D 2011/006* (2013.01); *F16D 2023/0643* (2013.01); *F16H 48/11* (2013.01)

(58) Field of Classification Search
CPC ............... F16D 13/38; F16D 23/0612; F16D 2023/0643; F16D 2011/006; F16D 13/06; F16D 13/14; F16D 43/211
See application file for complete search history.

(56) References Cited

U.S. PATENT DOCUMENTS

| 1,156,848 A | 10/1915 | Miller |
| 3,913,713 A | 10/1975 | F'Geppert |
| 4,138,006 A | 2/1979 | Benson, Jr. |

(Continued)

FOREIGN PATENT DOCUMENTS

| CN | 1656327 | 8/2005 |
| CN | 101344162 | 1/2009 |
| JP | 2001099186 | 4/2001 |

*Primary Examiner* — Jacob S Scott
*Assistant Examiner* — Tinh Dang
(74) *Attorney, Agent, or Firm* — Simpson & Simpson, PLLC (57) ABSTRACT

A drive disconnect clutch assembly, including: an input component arranged to receive torque from a motor; an output gear; and a clutch including: a flexible piston plate; at least one clutch plate; at least one wedge plate; and friction material disposed between the at least one clutch plate and the at least one wedge plate. For a synchronizing mode, the flexible piston plate is arranged to displace in an axial direction to engage the at least one clutch plate with the at least one wedge plate to enable transfer of torque from the input component to the output gear. For a locked mode, a first portion of the flexible piston plate is arranged to further displace in the first axial direction to expand the at least one wedge plate radially outward and non-rotatably connect the at least one wedge plate, the input component, and the output gear.

20 Claims, 8 Drawing Sheets

(51) Int. Cl.
*F16H 48/11* (2012.01)
*F16D 11/00* (2006.01)

(56) References Cited

U.S. PATENT DOCUMENTS

| | | | |
|---|---|---|---|
| 5,176,591 A | 1/1993 | Krisher | |
| 5,885,182 A | 3/1999 | Forsyth | |
| 6,079,535 A * | 6/2000 | Mueller | B60K 17/34 |
| | | | 180/247 |
| 6,520,885 B2 | 2/2003 | Gassmann et al. | |
| 6,790,154 B1 | 9/2004 | Kelley, Jr. | |
| 7,150,694 B2 | 12/2006 | Mizon et al. | |
| 7,309,301 B2 | 12/2007 | Janson et al. | |
| 7,448,977 B2 | 11/2008 | Janson et al. | |
| 7,938,041 B1 | 5/2011 | Shiigi et al. | |
| 8,920,282 B2 * | 12/2014 | Ari | F16D 27/12 |
| | | | 475/321 |
| 2001/0032768 A1 | 10/2001 | Gassmann et al. | |
| 2009/0159390 A1 | 6/2009 | David | |
| 2010/0004837 A1 | 1/2010 | Connolly et al. | |
| 2010/0024582 A1 | 2/2010 | Fitzgerald | |
| 2011/0045934 A1 | 2/2011 | Biermann et al. | |
| 2015/0060223 A1 * | 3/2015 | Ohr | F16D 41/082 |
| | | | 192/45.1 |

* cited by examiner

ALL-WHEEL DRIVE DISCONNECT CLUTCH

CROSS-REFERENCE TO RELATED APPLICATIONS

This is a continuation-in-part patent application under 35 U.S.C. §120 of U.S. patent application Ser. No. 13/849,142, filed Mar. 22, 2013, which application claims the benefit under 35 U.S.C. 119(e) of U.S. Provisional Application No. 61/615,655 filed Mar. 26, 2012, which applications are incorporated herein by reference in their entirety.

TECHNICAL FIELD

The present disclosure relates a drive disconnect clutch for providing torque to a secondary drive shaft in an all-wheel drive vehicle, specifically, a drive disconnect clutch providing synchronization with frictional engagement of clutch plates and a locked connection with expanding wedge plates.

BACKGROUND

For providing torque to a secondary drive shaft of an all-wheel drive vehicle, U.S. Pat. No. 7,150,694 is an example of using a clutch in a power transfer unit (PTU), which adds to the mass and size of the PTU. U.S. Pat. No. 7,150,694 and U.S. Pat. No. 7,309,301 are examples of using a transfer (typically wet) clutch in a differential to control torque to a secondary drive shaft. Pressurized fluid must be continuously supplied to keep the clutches in a closed mode, adding to the power usage associated with usage of the clutches. U.S. Pat. No. 6,520,885 is an example of using a roller or dog clutch to control torque to a secondary drive shaft. However, a vehicle must be at a stand still to use such clutches.

SUMMARY

According to aspects illustrated herein, there is provided a drive disconnect clutch assembly, including: an input component arranged to receive torque from a motor; an output gear; and a clutch including: a flexible piston plate; at least one clutch plate; at least one wedge plate; and respective friction material disposed between the at least one clutch plate and the at least one wedge plate. For a synchronizing mode, the flexible piston plate is arranged to displace in a first axial direction to engage the at least one clutch plate with the at least one wedge plate to enable transfer of torque from the input component to the output gear. For a locked mode, a first portion of the flexible piston plate is arranged to further displace in the first axial direction to expand the at least one wedge plate radially outward and non-rotatably connect the at least one wedge plate, the input component, and the output gear.

According to aspects illustrated herein, there is provided a drive disconnect clutch, including: an input component arranged for driving connection to a motor; an output gear; and a clutch including: a flexible piston plate; at least one clutch plate; at least one wedge plate; and respective friction material disposed between the at least one clutch plate and the at least one wedge plate. For a synchronizing mode, the flexible piston plate is arranged to displace a distance in a first axial direction to engage the at least one clutch plate with the at least one wedge plate to enable transfer of torque from the input component to the output gear. For a locked mode a first portion of the flexible piston plate is arranged to further displace in the first axial direction to displace: the at least one wedge plate to non-rotatably connect the input component and the output gear via contact of the at least one wedge plate with the input component and the output gear; and a second portion of the flexible piston plate radially outward.

According to aspects illustrated herein, there is provided a drive disconnect clutch, including: an input component arranged to receive torque from a motor; an output gear; and a clutch including: a piston plate; at least one clutch plate; at least one wedge plate; and respective friction material disposed between the at least one clutch plate and the at least one wedge plate. For a synchronizing mode, the flexible piston plate is arranged to displace a first distance in a first axial distance to clamp the at least one clutch plate and the at least one wedge plate to rotationally connect the input component and the output gear. For a locked mode: a first portion of the flexible piston plate is arranged to further displace in the first axial direction to displace the at least one wedge plate to lock respective rotations of the input component and the output gear via contact of the at least one wedge plate with the input component and the output gear; and a second portion of the flexible piston plate is arranged to displace radially outward as the first portion of the flexible piston plate further displaces in the first axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
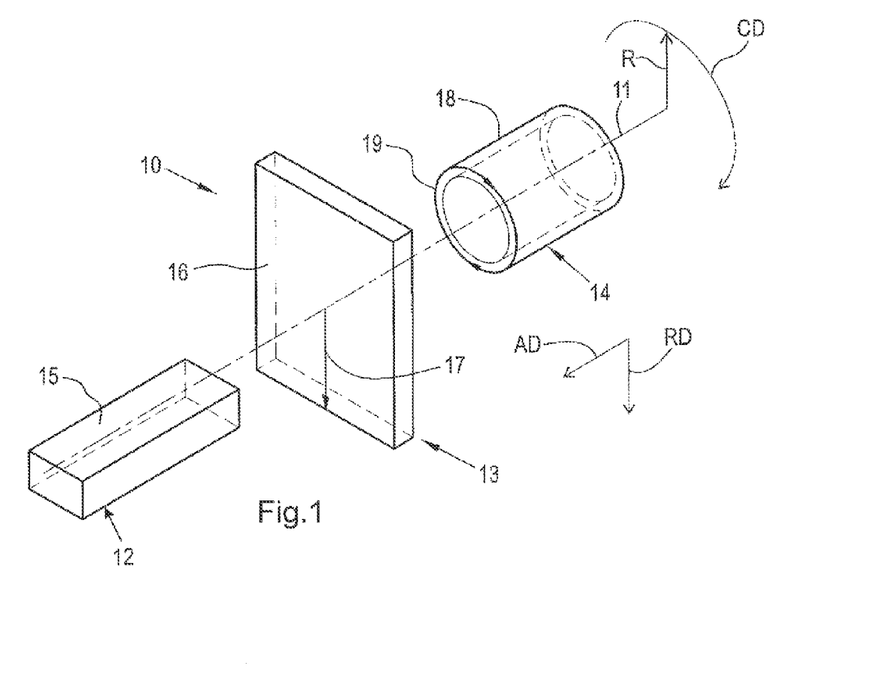
FIG. 1 is a perspective view of a cylindrical coordinate system demonstrating spatial terminology used in the present application; and, FIG. 2 is a schematic representation of a vehicle with a drive disconnect clutch assembly in a differential assembly.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
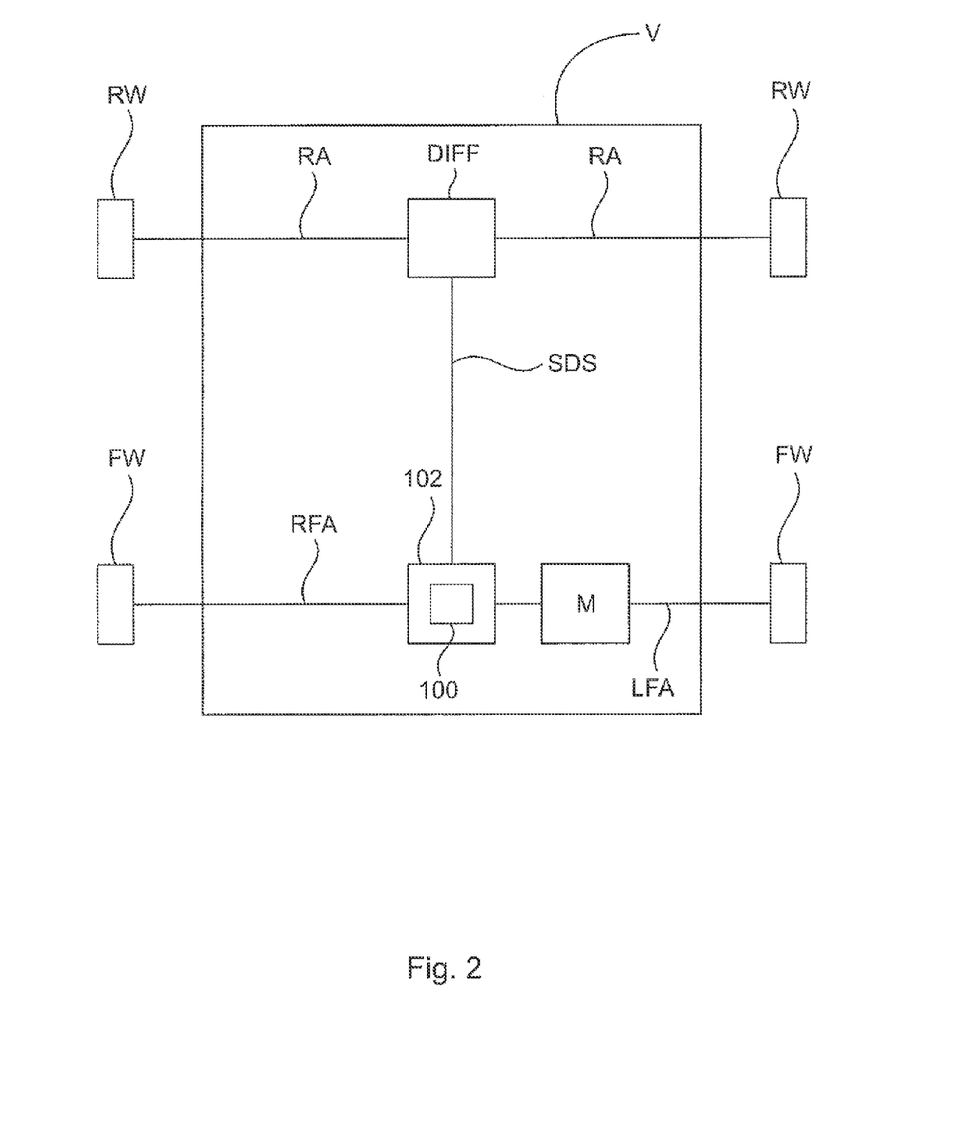

FIG. 2 is a schematic representation of a vehicle with drive disconnect clutch assembly 100 in differential assembly 102.

Figure 3:
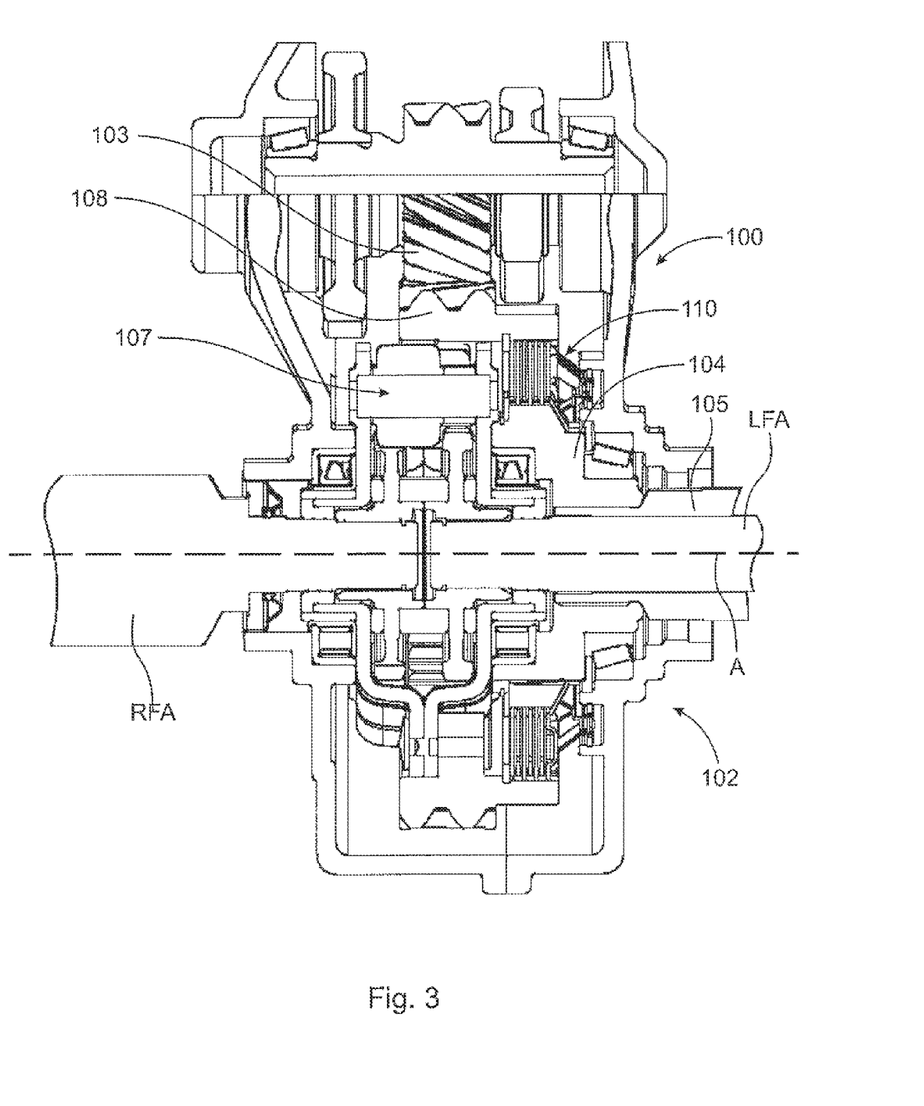
FIG. 3 is a cross-sectional view of a drive disconnect clutch assembly in a differential assembly.

FIG. 3 is a cross-sectional view of drive disconnect clutch assembly 100 in differential assembly 102.

Figure 4:
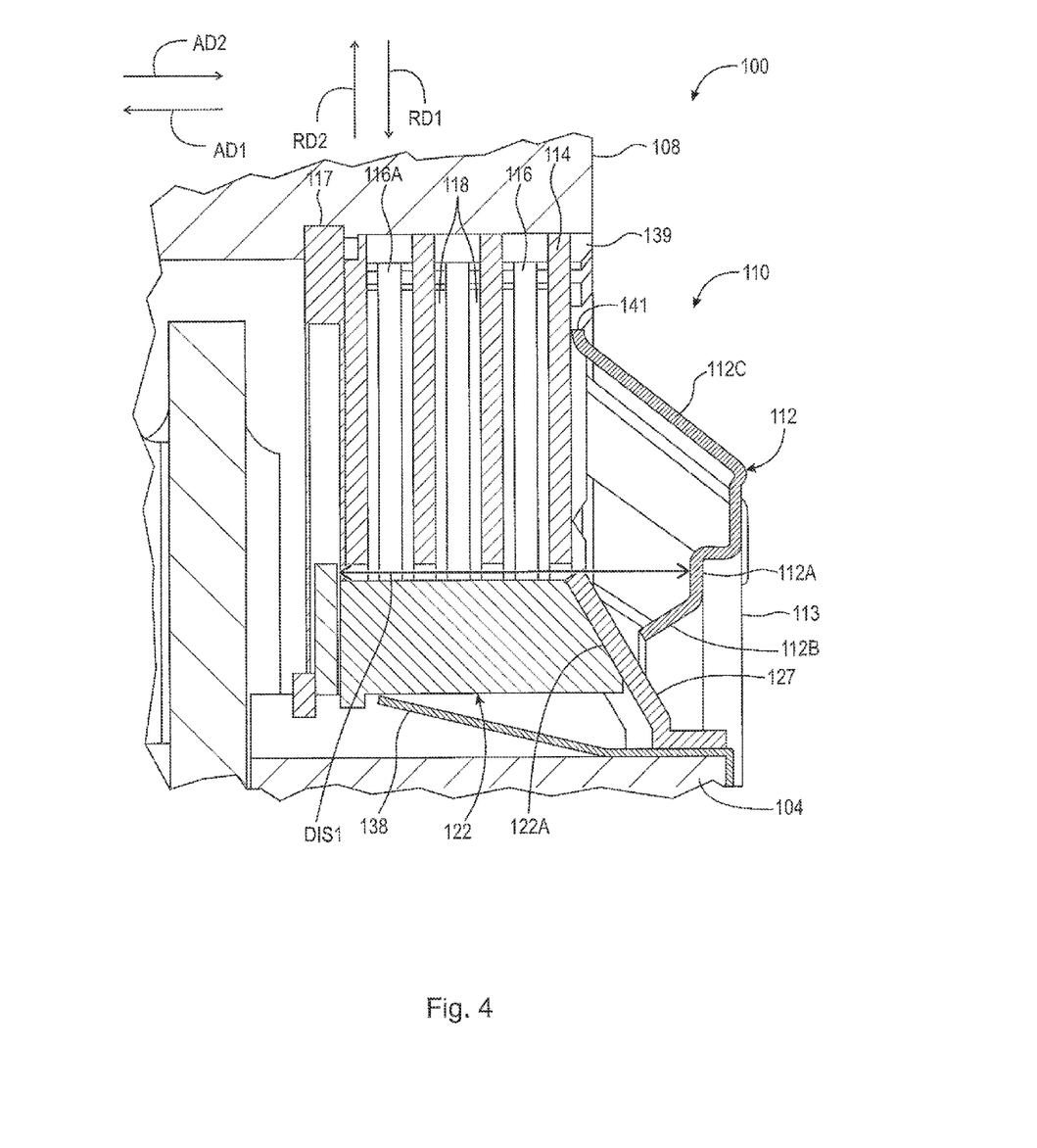
FIG. 4 is a detail of the drive disconnect clutch assembly in FIG. 3 in a disengaged mode.

FIG. 4 is a detail of drive disconnect clutch assembly 100 in FIG. 3 in a disengaged mode. The following should be viewed in light of FIGS. 2 through 4. Vehicle V has a standard four-wheel-drive drive vehicle architecture, for example, M is a transverse engine powering the front wheels FW via right front axle RFA, left front axle LFA, and differential assembly 102. Assemblies 100 and 102 are used for connecting and disconnecting a secondary drive shaft SDS, for example, a rear drive shaft, with torque from motor M. Shaft SDS provides torque to rear wheels RW via rear differential assembly DIFF and rear axles RA. Assembly 100 is integrated into differential assembly 102. Thus, as further described below, assembly 100 provides a synchronizing function and a locking clutch to engage and disengage the output/torque of the motor with SDS.

Drive disconnect clutch assembly 100 includes: axis of rotation A; input, or input component (final drive ring gear), 108, arranged to receive torque from the motor, for example via final drive pinion shaft 103; output, or output gear, 104; and clutch 110. Output 104 transmits torque to SDS via shaft 105. Gear 108 transmits torque to LFA and RFA via differential gear set 107. Clutch 110 includes flexible piston plate 112, at least one clutch plate 114, at least one wedge plate 116, backing plate 117, and respective friction material 118 disposed between the at least one clutch plate and the at least one wedge plate. In an example embodiment, flexible piston plate 112 is a Belleville spring. In an example embodiment, backing plate 117 is axially fixed to component 108.

In an example embodiment, the friction material is fixed to the at least one wedge plate, but in other embodiments (not shown), the friction material may be fixed to the at least one clutch plate or the friction material may be respective separate discs free of fixed connection to the wedge and clutch plates. In the example illustrated by the figures, assembly 100 includes three plates 114 and three plates 116; however, it should be understood that assembly 100 is not limited to a particular number of plates 114 or plates 116 or a particular ratio of plates 114 to plates 116. To simplify the presentation, the discussion that follows is directed to "plates 114," "clutch plates," "plates 116," and "wedge plates"; however, it should be understood that the discussion is applicable to configurations including only one clutch plate or wedge plate, or only one each clutch plate and wedge plate.

As for a typical wet clutch arrangement, clutch plates 114 are keyed to the input component such that the clutch plates are axially displaceable and rotationally connected to the input component. By "rotationally connected" we mean that two or more components are directly or indirectly connected such that respective rotations of the components are locked. That is, whenever one of the components rotates, the other of the components rotates in unison. Slots 137 and splines 139 of the input component are used to engage the clutch plates.

In a disengaged mode, as shown in FIG. 4, the flexible piston plate is positioned such that the flexible piston plate does not clamp the clutch plates and the wedge plates. Further, as described below, the wedge plates are rotationally locked with the output component. Thus, the clutch plates and the input are rotatable with respect to the wedge plates and the output component and torque is not transmitted from the input to the output.

Figure 5:
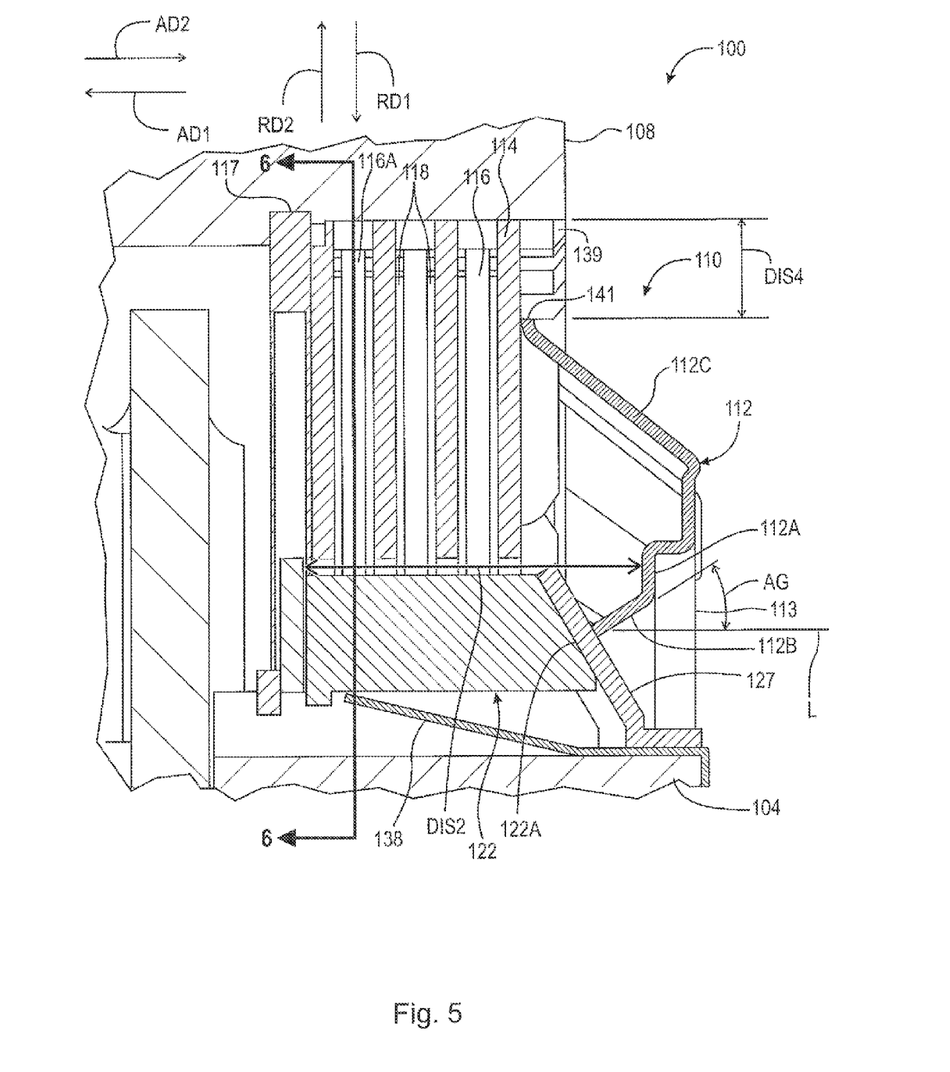
FIG. 5 is a detail of the drive disconnect clutch assembly in FIG. 3 in a synchronizing mode.

FIG. 5 is a detail of drive disconnect clutch assembly 100 in FIG. 3 in a synchronizing mode. The following should be viewed in light of FIGS. 2 through 5. As further described infra, in a synchronizing mode, the wedge plates remain rotationally connected to the output component and the flexible piston plate is arranged to displace in axial direction AD1 to clamp the clutch plates and the wedge plates to the backing plate to enable transmission of torque between the input component and the output gear. For example, actuator element 113, engaged with portion 112A of piston 112, displaces in axial direction AD1 to displace piston 112 in direction AD1.

In the discussion that follows, backing plate 117 is used as an axially fixed point of reference; however, it should be understood that if plate 117 is not axially fixed, the discussion below is applicable to another axially fixed point, such as a portion of the input component. In particular: prior to initiating the synchronizing mode (as shown in FIG. 4), portion 112A is separated from backing plate 117 by distance DIS1; and after the synchronizing mode is implemented, portion 112A is separated from plate 117 by distance DIS2, less than DIS1.

The engagement of the clutch plates and wedge plates enables a portion of the torque generated by the motor to be transmitted to the output gear, for example, as further described infra, to synchronize energy, or rotational speeds, of the input component and the output component, as well as other components connected to the output component, such as shaft 105 and secondary drive shaft SDS. In an example embodiment of the synchronizing mode, the wedge and clutch plates slip with respect to each other to limit the torque transmitted by clutch 110.

Figure 6:
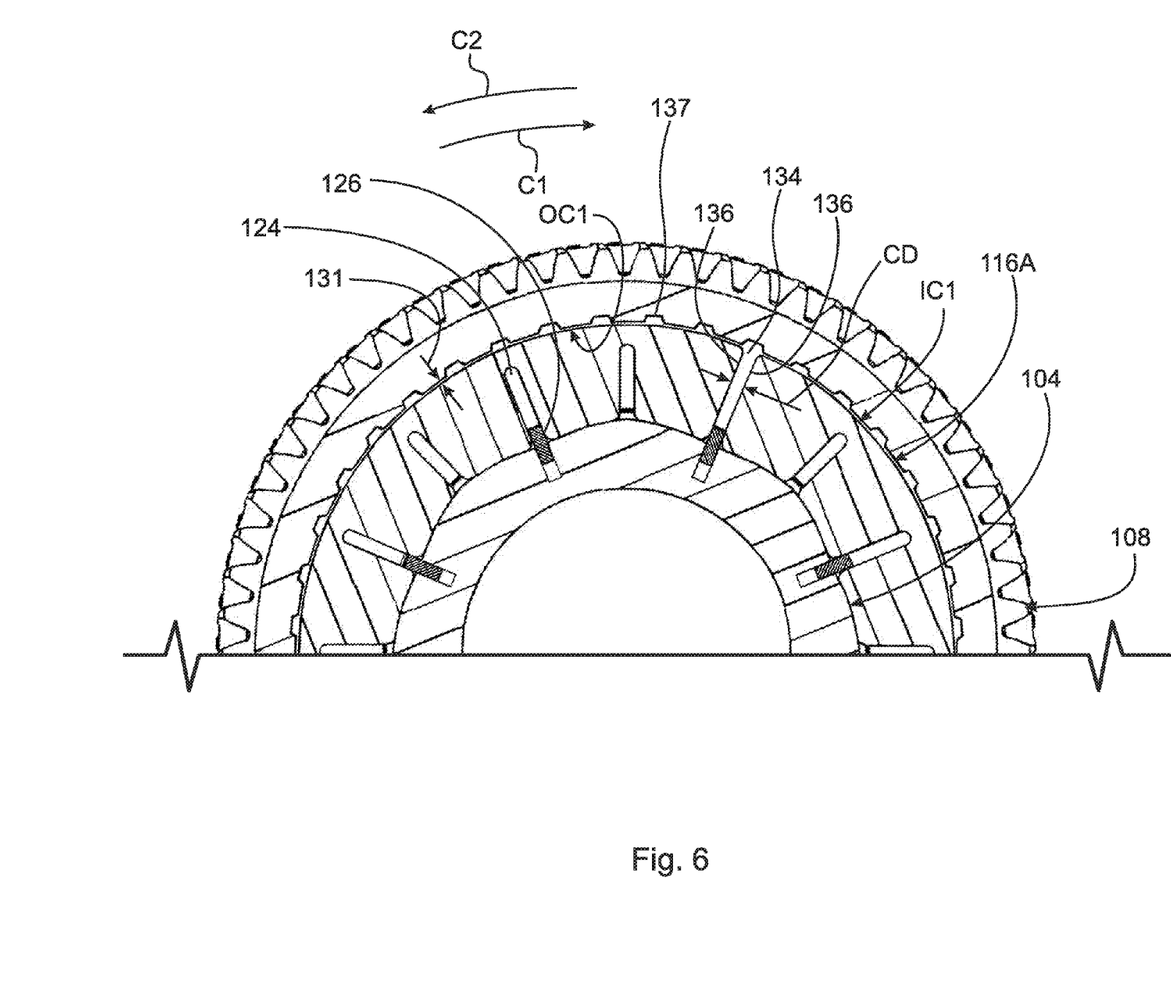
FIG. 6 is a sectional view generally along line 6-6 in FIG. 5.
Figure 7:
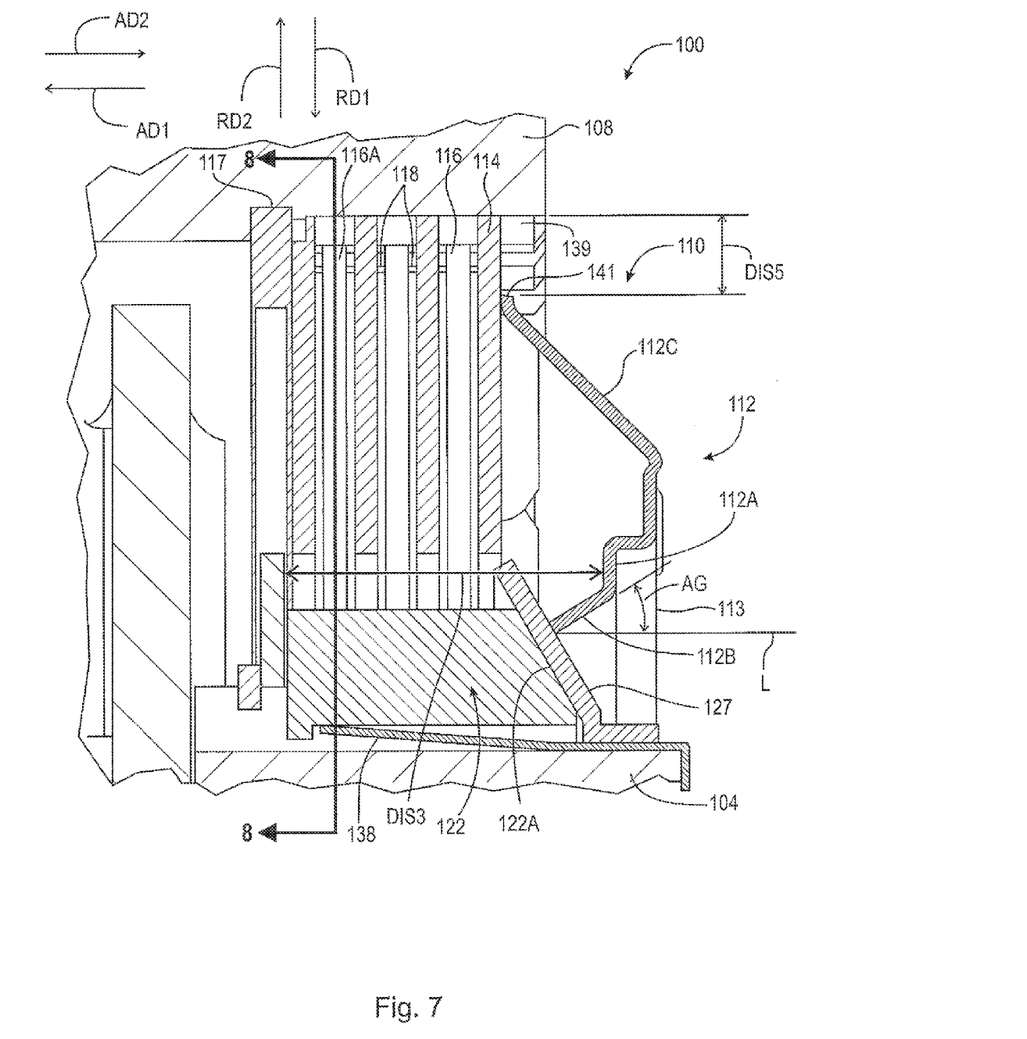
FIG. 7 is a detail of the drive disconnect clutch assembly in FIG. 3 in a locked mode; and, FIG. 8 is a sectional view generally along line 8-8 in FIG. 7.

Clutch 110 includes wedge plate key 122 (shown in FIGS. 4, 5, and 7). Wedge plate key 122 represents only one of a plurality of keys 126 (shown in FIGS. 6 and 8). In the disengaged and synchronizing modes, keys 126 non-rotatably connect output gear 104 with the wedge plates. As further described infra, in a locked mode, following the synchronizing mode, portions 112A and 112B of the flexible piston plate are arranged to displace further in direction AD1 to displace wedge plate key 122 (or keys 126) to lock rotation of the wedge plates with rotation of the input component and the output gear. For example, actuator element 113 displaces further in axial direction AD1 to displace portion 112A and portion 112B in direction AD1 to displace wedge plate key 122 in radial direction RD1 as further described below (see FIG. 7).

To initiate the locked mode, in response to the further displacement of piston 112 in direction AD1, portion 112C of plate 112 (engaged with one of clutch plates 114) slides along the clutch plate to displace in direction RD2. In particular, radially outermost edge 141 of portion 112C displaces in direction RD2. In an example embodiment, a nominal displacement of edge 141 in direction AD1 is possible. That is, portion 112C is flexible to enable portions 112A and 112B to further displace in direction AD1 despite edge 141 being essentially blocked from further displacement in direction AD1. Thus, in the locked mode, portion 112A is separated from backing plate 117 by distance DIS3, less than DIS2. In an example embodiment, portions 112A and 112B are not flexible, for example, angle AG between portion 112B and line L parallel to axis A is the same in the synchronizing and locked modes.

The radial displacement of piston 112 is illustrated by distances DIS4 and DIS5 in FIGS. 5 and 7, respectively, between edge 141 of the piston and the input component. In the synchronizing mode of FIG. 5, edge 141 is separated from the input component by distance DIS4. In the locked mode of FIG. 7, edge 141 has displaced radially outward so that DIS5 is less than DIS4.

Specifically, to implement the locked mode, the wedge plates are expanded in direction RD2 and wedged between the input component and the output gear. Once the wedge plates are displaced to non-rotatably connect the input component and the output gear, the full torque generated by the motor can be transferred from the input component to the output via the wedge plates. Thus, the clutch plates are no longer needed for torque transfer.

During the disengaged mode and the displacement of the piston in the synchronizing mode, the wedge plate key is engaged with the wedge plates to rotationally lock the wedge plates and the output gear. During the locked mode, the flexible piston plate is arranged to displace the wedge plate key to enable relative rotation between the wedge plates and the output component such that the wedge plates contact the input. This contact rotationally locks the wedge plates, the input component, and the output gear, enabling torque transmission between the input component and the output gear by the wedge plates without the use of the clutch plates.

FIG. 6 is a sectional view generally along line 6-6 in FIG. 5 with assembly 100 in the synchronizing mode. The following should be viewed in light of FIGS. 2 through 6. In FIG. 6, single wedge plate 116A is shown; however, it should be understood that the discussion is applicable to the remaining wedge plates. In an example embodiment, each wedge plate includes respective slots 124. Keys 126 are arranged to be disposed within slots 124 during the disengaged and synchronizing modes. The keys, like the wedge plate key, are rotationally connected to the output component; therefore, the keys rotationally connect the wedge plates and the output component while disposed in the slots. In the synchronizing mode, respective outer circumferences OC1 of the wedge plates and inner circumference IC1 of the input are separated by radial distance 131.

FIG. 7 is a detail of drive disconnect clutch assembly 100 in FIG. 3 in a locked mode.

Figure 8:
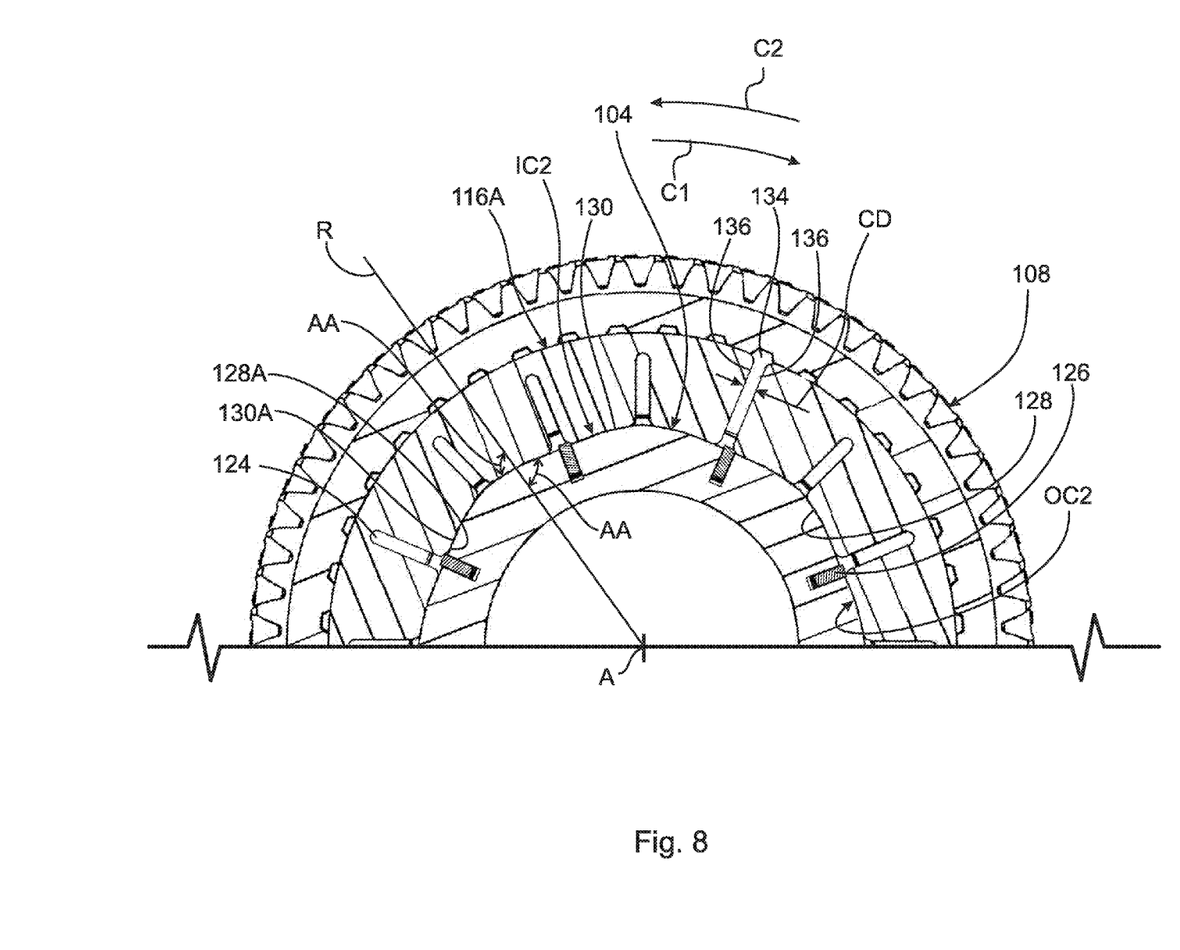

FIG. 8 is a sectional view generally along line 8-8 in FIG. 7. The following should be viewed in light of FIGS. 2 through 8. In the locked mode, the flexible piston plate is arranged to engage the wedge plate key to displace the plurality of keys radially inward such that the plurality of keys are disengaged from the plurality of slots, and the wedge plates and the output gear are rotatable with respect to each other such that the wedge plates compressively engage the input component and the output gear to non-rotatably connect the input component and the output gear. In an example embodiment, piston element 127, engaged with the flexible piston plate, and portion 122A of the wedge plate key are mutually angled such that as the flexible piston plate and element 127 urge 122A in direction AD1, 122A is displaced radially inward in direction RD1, drawing the keys out of slots 124. In an example embodiment, in the disengaged mode, portion 112B of the piston is free of contact with element 127 and edge 141 is in contact with a clutch plate.

In an example embodiment, the output gear includes outer circumference OC2 with flat surfaces 128 and the wedge plate includes inner circumference IC2 with flat surfaces 130. Pairs of mated surfaces 128 and 130, for example 128A and 130A, are at acute angle AA with respect to a radius R passing through the surfaces. That is, the surfaces form complementary ramps with respect to circumferential directions C1 and C2. In the disengaged and synchronizing modes, surfaces 128 and 130 are engaged such that distance 131 between the wedge plate and the input component is present.

In the locked mode, as further described infra, enabling the wedge plates to rotate with respect to the output component, for example, withdrawing the keys from the slots, causes the wedge plates to compressively engage the input component and the output gear (distance 131 is removed) to non-rotatably connect the input component and the output gear.

In the locked mode, the wedge plates are no longer fixed by keys 126 and the wedge plates and the output gear rotate with respect to each other due to the engagement of the wedge plates with the clutch plates. For example, if the clutch plates are rotating in direction C1, the wedge plates rotate in direction C1 with respect to the output gear. Respective surfaces 128 then slide along respective surfaces 130. That is, the frictional engagement of the wedge plates with the clutch plates urges the wedge plates in direction C1. Due to the ramp configuration described above, as surfaces 128 slide along surfaces 130, surfaces 128 are pushed radially outward, pushing IC2 of the wedge plates radially outward. In turn, as further described infra, OC1 also expands radially outward. It should be understood that movement of the clutch plates in direction C2, opposite C1, from the synchronizing position results in the same radially outward displacement of the wedge plates described above.

Thus, the wedge plates are in compressive engagement with the input component and the output gear to rotationally lock the input component and the output gear and to transmit torque between the input component and the output gear. By "compressive engagement," we mean for example that: the input component exerts pressure radially inward on the wedge plates, which in turn exert pressure radially inward on the output gear; and/or, the output gear exerts pressure radially outward on the wedge plates, which in turn exert pressure radially outward on the input component. In an example embodiment, the rotation of the wedge plates with respect to the output component is typically small, for example, two or three degrees. However, it should be understood that other amounts of relative rotation between the wedge plates and the output component are possible.

In an example embodiment, the wedge plates are discontinuous in the circumferential directions by virtue of a radially disposed space 134 separating circumferential ends 136 of the wedge plate by circumferential distance CD. In the locked mode, the flexible piston plate, via the output gear, element 127 and wedge plate key 122, are arranged to increase CD to expand the wedge plate radially outward. That is, space 134 enables the wedge plate to expand radially outward, in response to rotation of the wedge plates and the sliding contact of surfaces 128 and 130, to contact the input component.

In a drive mode of the locked mode, the wedge plates remain engaged with the input component and the output gear as long as torque from the motor is present on the input component, for example in direction C1. In a coast mode, torque from the motor is withdrawn from the input component (for example, an accelerator for the motor is released) and the wheels associated with axle SA are rotating and applying torque to shaft 105. For example, the torque from the axle causes the output gear to rotate in direction C2 with respect to the wedge plates to cause surfaces 128 and 130 to slide across each other, in a manner similar to that described above, so that the wedge plates radially expand and lock the input component with the output gear. Thus, as surfaces 128 and 130 slide toward the position associated with the synchronizing mode (keys aligned with slots 124) the wedge plates radially contract, but as surfaces 128 and 130 slide past the position, surfaces 128 and 130 cause the wedge plates to again expand. Thus, as long as the keys remain retracted, the wedge plates continue to transmit torque in alternating drive and coast modes.

In an example embodiment, clutch 110 includes resilient element 138 engaged with keys 126 and urging keys 126 radially outward in direction RD2, for example, urging the keys into slots 124 during the disengaged and synchronizing modes. For example, when the flexible piston plate displaces in direction AD1 against the wedge plate key, the action of the flexible piston plate displaces the keys radially inward against the force of the resilient element to enable rotation of the wedge plates with respect to the output component. If the piston is retracted such that the piston no longer urges the keys radially inward, element 138 urges the keys radially outward. In the locked mode, the keys are urged against surfaces 128, but cannot enter slots 124 due to the misalignment of the keys and slots 124.

To disengage the clutch (disengaged mode), the piston is withdrawn (displaced in direction AD2, opposite direction AD1), and keys 126 contact surfaces 128 as described above. Then, when a transition from torque in direction C1 to torque in direction C2 occurs (or vice versa) and the wedge plates circumferentially shift, slots 124 align with keys 126 and element 138 pushes keys 126 into slots 124, locking output component 104 and the wedge plates. The re-alignment of slots 124 and keys 126 enables OC1 to contract radially inward so that distance 131 is again formed, as described above. Therefore, the wedge plate rotates with the output gear, the wedge plate rotates independently of the input, and the clutch plates are unclamped. Thus, no torque is transmitted through assembly 100.

Advantageously, clutch 110 synchronizes the energy of stationary components during initial clutch lock up, for example in the synchronizing mode. For example, when clutch 100 is disengaged, torque from the motor is not supplied to the "downstream" components such as the output gear, shaft 105, and shaft SDS and these components are at rest. As described supra, to begin clutch 110 lockup, an axial force is applied by the flexible piston plate forcing frictional engagement of the friction material with the clutch and wedge plate. The axial friction force functions in clutch 110, for example, as for a typical automatic transmission wet clutch, until the entire driveline (including down stream components) has reached a synchronized speed, or a point near the synchronized speed such that noise, vibration, harshness (NVH) is satisfactory.

The slipping inherent in the engagement of the clutch and wedge plates for a wet clutch ensures a smooth transmission of sufficient torque to initiate rotation of the downstream components. Thus, in the synchronizing mode described supra, clamping the clutch plates and wedge plates in clutch 110 transmits torque from the motor such that the downstream components are brought from rest positions to respective rotational speeds synchronized with the input to assembly 100.

In the locked mode described supra, when the driveline has reached the synchronized speed, or the point near the synchronized speed, clutch 110, via the compressive engagement of the wedge plates with the input component and the output gear, transmits full driveline torque requirements to the secondary drive shaft. Thus, an abrupt transfer of torque, with an associated and undesirable jolt, is avoided by first synchronizing the driveline and then engaging the wedge plates. In addition, assembly 100 does not increase the size of a state-of-the-art bevel gear differential assembly with a disconnect clutch in the location of clutch 110.

Although a particular configuration of clutch plates and wedge plates is shown, it should be understood that assembly 100 is not limited to the configuration shown. Other numbers of clutch plates or wedge plates are possible in order to satisfy surface area requirements for torque transfer.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A drive disconnect clutch assembly, comprising:
   an input component arranged to receive torque from a motor;
   an output gear; and,
   a clutch including:
   a flexible piston plate;
   at least one clutch plate;
   at least one wedge plate; and,
   respective friction material disposed between the at least one clutch plate and the at least one wedge plate, wherein:
   for a synchronizing mode, the flexible piston plate is arranged to displace in a first axial direction to engage the at least one clutch plate with the at least one wedge plate to enable transfer of torque from the input component to the output gear; and,
   for a locked mode, a first portion of the flexible piston plate is arranged to further displace in the first axial direction to enable relative rotation between the at least one wedge plate and the output gear to:
   expand the at least one wedge plate radially outward; and,
   non-rotatably connect the at least one wedge plate, the input component, and the output gear.

2. The drive disconnect clutch assembly of claim 1, wherein for the locked mode, the at least one wedge plate is in contact with the input component and the output gear.

3. The drive disconnect clutch assembly of claim 1, wherein for the locked mode, a second portion of the flexible piston plate is arranged to displace radially outward.

4. The drive disconnect clutch assembly of claim 3, wherein the second portion of the flexible piston plate includes a radially outermost edge of the flexible piston plate.

5. The drive disconnect clutch assembly of claim 1, wherein in a disengaged mode:
the at least one wedge plate is non-rotatably connected to the output gear; and,
the input component is independently rotatable with respect to the output gear.

6. The drive disconnect clutch assembly of claim 1, wherein in the synchronizing mode, an outer circumference of the at least one wedge plate is free of contact with the input component.

7. The drive disconnect clutch assembly of claim 1, wherein:
the clutch includes a wedge plate key;
the wedge plate key is non-rotatably connected to the output gear;
in the synchronizing mode, the wedge plate key is engaged with the at least one wedge plate to non-rotatably connect the at least one wedge plate and the output gear; and,
to initiate the locked mode, the flexible piston plate is arranged to displace the wedge plate key such that the at least one wedge plate and the output gear are rotatable with respect to each other to compressively engage the at least one wedge plate with the input component and the output gear.

8. The drive disconnect clutch assembly of claim 7, wherein:
the at least one wedge plate includes respective pluralities of slots;
the wedge plate key includes a plurality of keys arranged to be disposed within the respective pluralities of slots in the synchronizing mode; and,
the first portion of the flexible piston plate is arranged to further displace in the first axial direction to engage the wedge plate key to displace the plurality of keys radially inward such that:
the plurality of keys are disengaged from the respective pluralities of slots; and,
the at least one wedge plate and the output gear are rotatable with respect to each other to compressively engage the input component to non-rotatably connect the input component and the output gear.

9. The drive disconnect clutch assembly of claim 1, wherein:
the output gear includes an outer circumference with a first plurality of flat surfaces;
the at least one wedge plate includes at least one inner circumference with at least one second plurality of flat surfaces in contact with the first plurality of flat surfaces; and,
the first portion of the flexible piston plate is arranged to further displace in the first axial direction such that:
the at least one wedge plate and the output gear rotate with respect to each other; and,
the first plurality of flat surfaces and the at least one second plurality of flat surfaces slide across each other to displace the at least one wedge plate radially outward to compressively engage the input component and non-rotatably connect the input component and the output gear.

10. The drive disconnect clutch assembly of claim 1, wherein:
the at least one wedge plate is discontinuous in a circumferential direction by virtue of at least one radially disposed space separating at least one first and second circumferential ends of the at least one wedge plate by at least one circumferential distance; and,
the first portion of the flexible piston plate is arranged to further displace in the first axial direction to increase the at least one circumferential distance to expand the at least one wedge plate radially outward.

11. The drive disconnect clutch assembly of claim 10, wherein the at least one wedge plate is arranged to expand radially outward to compressively engage the input component and the output gear to non-rotatably connect the input component and the output gear.

12. A drive disconnect clutch, comprising:
an input component arranged for driving connection to a motor;
an output gear; and,
a clutch including:
a flexible piston plate;
at least one clutch plate;
at least one wedge plate; and,
respective friction material disposed between the at least one clutch plate and the at least one wedge plate, wherein:
for a synchronizing mode, the flexible piston plate is arranged to displace a distance in a first axial direction to engage the at least one clutch plate with the at least one wedge plate to enable transfer of torque from the input component to the output gear; and,
for a locked mode a first portion of the flexible piston plate is arranged to further displace in the first axial direction to displace:
the at least one wedge plate to non-rotatably connect the input component and the output gear via contact of the at least one wedge plate with the input component and the output gear; and,
a second portion of the flexible piston plate radially outward.

13. The drive disconnect clutch assembly of claim 12, wherein the first portion of the flexible piston plate is arranged to further displace in the first axial direction to:
enable relative rotation between the at least one wedge plate and the output gear; and,
expand the at least one wedge plate radially outward.

14. The drive disconnect clutch assembly of claim 12, wherein in a disengaged mode:
the at least one wedge plate is non-rotatably connected to the output gear; and,
the input component is independently rotatable with respect to the output gear.

15. The drive disconnect clutch assembly of claim 12, wherein in the synchronizing mode, an outer circumference of the at least one wedge plate is free of contact with the input component.

16. The drive disconnect clutch assembly of claim 12, wherein:
the clutch includes a wedge plate key with a plurality of radially displaceable keys,
the wedge plate key is non-rotatably connected to the output gear;

in the synchronizing mode, the plurality of keys engages the at least one wedge plate to non-rotatably connect the at least one wedge plate and the output gear; and, in the locked mode, the flexible piston plate is arranged to displace the plurality of keys radially inward to enable relative rotation between the at least one wedge plate and the output gear.

17. The drive disconnect clutch assembly of claim 12, wherein:

the output gear includes an outer circumference with a first plurality of flat surfaces;

the at least one wedge plate includes at least one inner circumference with at least one second plurality of flat surfaces in contact with the first plurality of flat surfaces; and, the first portion of the flexible piston plate is arranged to further displace in the first axial direction such that:

the at least one wedge plate and the output gear rotate with respect to each other; and, the first plurality of flat surfaces and the at least one second plurality of flat surfaces slide across each other to displace the at least one wedge plate radially outward to compressively engage the input component and non-rotatably connect the input component and the output gear.

18. The drive disconnect clutch assembly of claim 12, wherein:

in a drive mode for the locked mode, the input component is arranged to rotate in a first rotational direction; and, in a coast mode for the locked mode, the output gear is arranged to transmit torque to the at least one wedge plate such that the input component rotates in a second rotational direction, opposite the first rotational direction.

19. A drive disconnect clutch assembly, comprising:

an input component arranged to receive torque from a motor;

an output gear; and, a clutch including:

a piston plate;

at least one clutch plate;

at least one wedge plate;

respective friction material disposed between the at least one clutch plate and the at least one wedge plate; and, a wedge plate key non-rotatably connected to the output gear and including a plurality of radially displaceable keys, wherein:

for a synchronizing mode:

the plurality of radially displaceable keys is non-rotatably connected to the at least one wedge plate; and, the flexible piston plate is arranged to displace a distance in an axial direction to engage the at least one clutch plate with the at least one wedge plate to enable transfer of torque from the input component to the output gear; and, for a locked mode a first portion of the flexible piston plate is arranged to further displace in the axial direction to retract the plurality of radially displaceable keys to:

enable rotation between the at least one wedge plate and the output gear;

non-rotatably connect the at least one wedge plate, the input component, and the output gear; and, displace a second portion of the flexible piston plate radially outward.

20. The drive disconnect clutch assembly of claim 19, wherein:

the output gear includes an outer circumference formed by a first plurality of flat sides;

the at least one wedge plate includes at least one inner circumference formed by at least one second plurality of flat sides in contact with the first plurality of flat sides; and, the first portion of the flexible piston plate is arranged to further displace in the axial direction to:

enable the first plurality of flat sides and the at least one second plurality of flat sides to slide across each other; and, expand the at least one wedge plate radially outward.

\* \* \* \* \*